US008991154B2

(12) United States Patent
Tai et al.

(10) Patent No.: US 8,991,154 B2
(45) Date of Patent: Mar. 31, 2015

(54) METHODS AND SYSTEMS FOR CONTROLLING REDUCTANT LEVELS IN AN SCR CATALYST

(75) Inventors: Chun Tai, Hagerstown, MD (US);
Timothy Booher, Franklin, KY (US);
Heath Morris, Martinsburg, WV (US)

(73) Assignee: Mack Trucks, Inc., Greensboro, NC (US)

( * ) Notice: Subject to any disclaimer, the term of this patent is extended or adjusted under 35 U.S.C. 154(b) by 938 days.

(21) Appl. No.: 12/834,126

(22) Filed: Jul. 12, 2010

(65) Prior Publication Data

US 2012/0006004 A1 Jan. 12, 2012

(51) Int. Cl.
*F01N 3/00* (2006.01)
*F01N 3/20* (2006.01)

(52) U.S. Cl.
CPC ......... *F01N 3/208* (2013.01); *F01N 2900/1621* (2013.01); *Y02T 10/24* (2013.01)
USPC ................................. 60/286; 60/297; 60/299

(58) Field of Classification Search
CPC ............ F01N 2900/1621; F01N 3/208; F01N 2550/02; F01N 2550/05
USPC .................................................. 60/273–324
See application file for complete search history.

(56) References Cited

U.S. PATENT DOCUMENTS

| | | | |
|---|---|---|---|
| 6,415,602 B1 | 7/2002 | Patchett et al. | |
| 6,833,272 B1 | 12/2004 | Binder et al. | |
| 7,093,427 B2 | 8/2006 | van Nieuwstadt et al. | |
| 7,178,328 B2 | 2/2007 | Solbrig | |
| 7,736,595 B2 * | 6/2010 | Gady et al. | 422/105 |
| 2007/0044457 A1 * | 3/2007 | Upadhyay et al. | 60/295 |
| 2007/0137181 A1 * | 6/2007 | Upadhyay et al. | 60/286 |
| 2009/0293451 A1 * | 12/2009 | Kesse | 60/274 |
| 2010/0242440 A1 * | 9/2010 | Garimella et al. | 60/276 |
| 2011/0005203 A1 * | 1/2011 | Gady | 60/276 |
| 2011/0209461 A1 * | 9/2011 | Bays et al. | 60/274 |

FOREIGN PATENT DOCUMENTS

JP        2003293743 A  * 10/2003

OTHER PUBLICATIONS

English Machine Translation of JP2003-293743A to Kawai et al.*

* cited by examiner

*Primary Examiner* — Kenneth Bomberg
*Assistant Examiner* — Anthony Ayala Delgado
(74) *Attorney, Agent, or Firm* — WRB-IP LLP

(57) ABSTRACT

Methods and systems for controlling reductant levels in an SCR catalyst are provided. In one aspect, reductant levels are adjusted in response to a ratio of change of NOx conversion efficiency to a change of reductant level. In another aspect, reductant injection levels are periodically adjusted to see if NOx conversion efficiency is better or worse at the adjusted levels.

15 Claims, 4 Drawing Sheets

METHODS AND SYSTEMS FOR CONTROLLING REDUCTANT LEVELS IN AN SCR CATALYST

BACKGROUND AND SUMMARY

The present invention relates generally to Selective Catalytic Reduction (SCR) catalysts and, more particularly, to methods and systems for controlling reductant levels in SCR catalysts.

Selective catalytic reduction is an important tool in efforts to meet increasingly strict engine emissions standards. Certain techniques for reducing CO emissions result in greater production of nitrogen oxides, also referred to as NOx. SCR is a means of converting NOx with the aid of a catalyst into diatomic nitrogen, N2, and water, H2O. A gaseous reductant, typically anhydrous ammonia, aqueous ammonia or urea, is added to a stream of flue or exhaust gas and is absorbed onto a catalyst. Carbon dioxide, CO2 is a reaction product when urea is used as the reductant.

A controlled level of NH3 storage buffer in the catalyst is desired in order to maintain high NOx conversion efficiency ($\mu_{NOx}$), defined here by $$\mu_{NOx} = \frac{NOx(\text{inlet}) - NOx(\text{outlet})}{NOx(\text{inlet})}, \quad (1)$$

where NOx(inlet) is the NOx level proximate an inlet of the SCR catalyst and NOx(outlet) is the NOx level proximate and outlet of the SCR catalyst. As seen in the schematic graph of FIG. 1A, NOx conversion efficiency can be reduced due to too low or too high an amount of stored NH3.

The known technique for controlling NH3 levels is not considered to produce acceptable results. By this technique, a device such as an electronic control unit (ECU) (various suitable devices are hereinafter referred to generically as a controller) estimates the amount of NH3 stored in the SCR catalyst by keeping track of how much NH3 has been added to the system via dosing and estimating how much NH3 has been consumed by reaction with NOx. The first component—addition of NH3—is quite simple because the amount of NH3 added is directly proportional to urea dosing because the urea decomposes to NH3 and CO2 under high temperature conditions with adequate humidity. The second component—consumption—can be somewhat more difficult because it uses an estimated exhaust mass flow in addition to NOx sensor measurements both before and after the SCR to estimate how much NOx is reduced. The technique assumes that the amount of NH3 that is used is directly proportional to the NOx that is reduced.

A problem with the known technique is that error accumulates over time in the stored NH3 calculation, which leads to reduced NOx conversion efficiency. The controller uses the modeled stored NH3 mass as a feedback to a controller that tries to maintain stored NH3 at the target. However with nothing to correct this model over time, there is a risk that the model will diverge from actual NH3 levels. In this case failure to properly control stored NH3 directly leads to reduced NOx conversion efficiency.

The only mechanism to keep the modeled stored NH3 from diverging from actual NH3 levels is to periodically start over by using all up of the NH3 in the SCR and then resetting the model. In addition to having a direct impact on emissions from the time the SCR begins to operate at low efficiency as the actual stored NH3 approaches zero, emissions control can be dramatically compromised if the model diverges from actual levels before the calibration is triggered.

It is desirable to provide a method and a system for controlling NH3 levels to better ensure NH3 levels in an SCR catalyst are kept within a desired range.

In accordance with an aspect of the present invention, a method of controlling reductant levels in an SCR catalyst comprises measuring a change of NOx conversion efficiency ($d\mu_{NOx}$) across the SCR catalyst, measuring a change of reductant level (dB) in the SCR catalyst, comparing a measured ratio $d\mu_{NOx}/dB$ to a target ratio, and adjusting reductant injection to cause the measured ratio to approach the target ratio.

In accordance with another aspect of the present invention, a system for controlling reductant levels in an SCR catalyst comprises an injector for injecting reductant upstream of the SCR catalyst, and a controller arranged to measure a change of NOx conversion efficiency ($d\mu_{NOx}$) across the SCR catalyst, measure a change of reductant level (dB) in the SCR catalyst, compare a measured ratio $d\mu_{NOx}/dB$ to a target ratio, and control the injector to adjust reductant injection to cause the measured ratio to approach the target ratio.

In accordance with another aspect of the present invention, a method of controlling reductant levels in an SCR catalyst comprises a) calculating a quantity of reductant in the SCR catalyst as a function of an amount of reductant injected over a first period of time minus an amount of NOx reduced over the first period of time, b) determining a first NOx conversion efficiency ($\mu_{NOx1}$) at an end of the first period of time, c) changing reductant injection by a first change amount for a second period of time to a second injection rate different from an injection rate at the end of the first period of time, d) determining a second NOx conversion efficiency ($\mu_{NOx2}$) at the end of the second period of time and, if $\mu_{NOx2} > \mu_{NOx1}$, maintaining the second injection rate, and if $\mu_{NOx2} < \mu_{NOx1}$, changing reductant injection by a second change amount In accordance with another aspect of the present invention, a system for controlling reductant levels in an SCR catalyst comprises an injector for injecting reductant upstream of the SCR catalyst, and a controller arranged to calculate a quantity of reductant in the SCR catalyst as a function of an amount of reductant injected over a first period of time minus an amount of NOx reduced over the first period of time, determine a first NOx conversion efficiency ($\mu_{NOx1}$) at an end of the first period of time, control the injector to change reductant injection by a first change amount for a second period of time to a second injection rate different from an injection rate at the end of the first period of time, determine a second NOx conversion efficiency ($\mu_{NOx2}$) at the end of the second period of time and, if $\mu_{NOx2} > \mu_{NOx1}$, control the injector to maintain the second injection rate, and if $\mu_{NOx2} < \mu_{NOx1}$, control the injector to change reductant injection by a second change amount in a direction opposite a direction of the change amount.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 2:
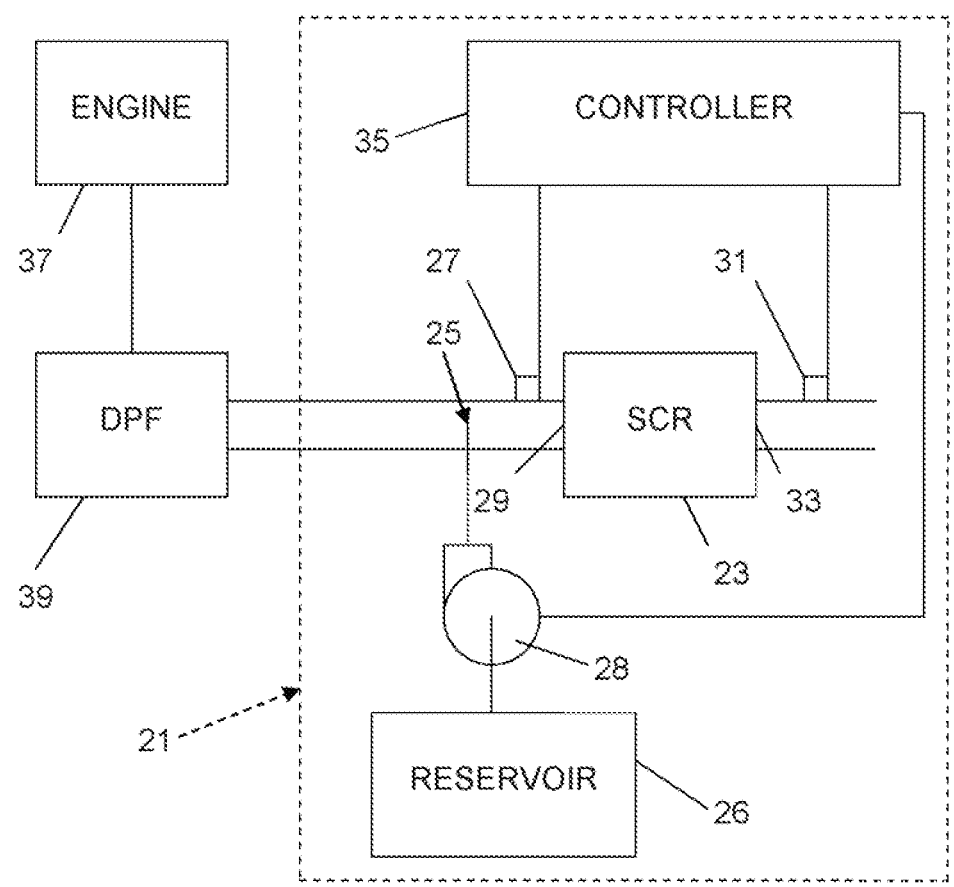
FIG. 2 is a schematic view of a system for controlling reductant levels in an SCR catalyst according to an aspect of the present invention.

FIG. 2 shows features of a system 21 for controlling reductant levels in an SCR catalyst 23 according to an aspect of the present invention. The system 21 includes an injector 25 for injecting reductant at a point upstream of the SCR catalyst 23. The reductant is typically stored in a reservoir 26 and the injector includes a suitable pump 28 for injection. The system 21 also includes a NOx sensor 27 proximate an inlet 29 of the SCR catalyst 23 for measuring inlet NOx levels (NOx(inlet)) and a NOx sensor 31 proximate an outlet 33 of the SCR catalyst for measuring outlet NOx levels (NOx(outlet)). The system 21 further comprises a controller 35, such as an electronic control unit (ECU) (various suitable devices are hereinafter referred to generically as a controller).

The system 21 and SCR catalyst 23 are part of an exhaust aftertreatment system of a diesel engine 37 such as might be used as a vehicle engine or for other purposes. Typically, the system 21 and SCR catalyst 23 are arranged downstream of a diesel particulate filter 39 in the aftertreatment system. The aftertreatment system may include other features not illustrated.

The controller 35 can be arranged to determine NOx conversion efficiency ($\mu_{NOx}$) by the equation $$\mu_{NOx} = \frac{NOx(\text{inlet}) - NOx(\text{outlet})}{NOx(\text{inlet})}, \tag{1}$$

The controller 35 can also be arranged to measure an amount of reductant injected over time (Bi) and measure an amount of NOx reduced ($NOx_{red}$) over time. The controller 35 can also be arranged to measure a change of reductant level (dB) in the SCR catalyst as a function of the amount of reductant (Bi) added over a period of time and the amount of NOx reduced ($NOx_{red}$) over the period of time.

Figure 1A:
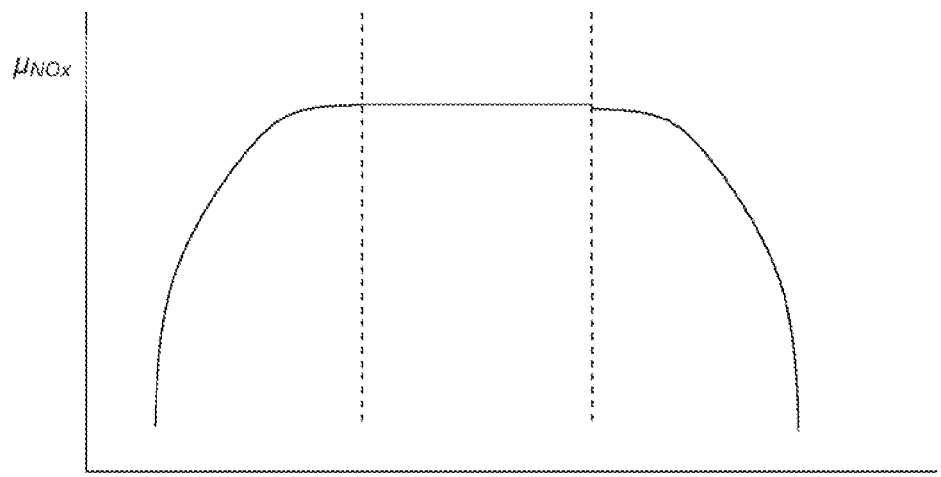
FIG. 1A is a schematic graph of NOx conversion efficiency ($\mu_{NOx}$) versus reductant level in a SCR catalyst.
Figure 1B:
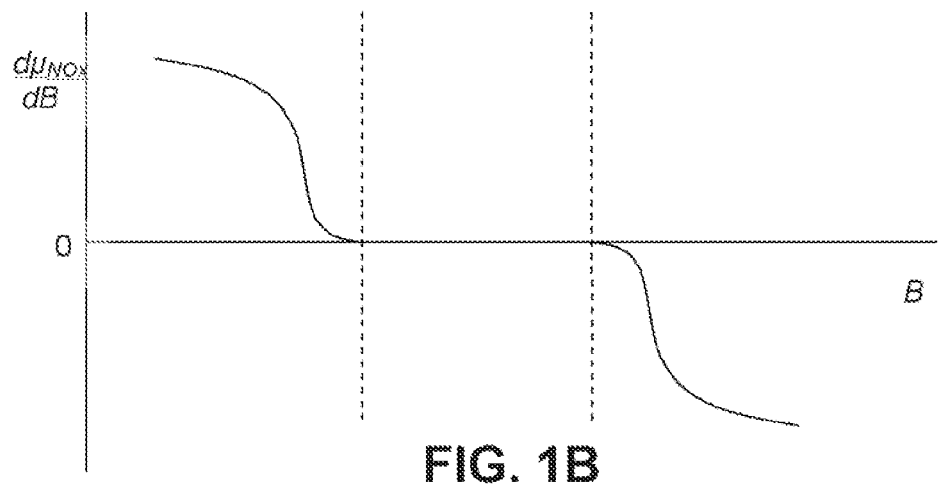
FIG. 1B is a schematic graph of a ratio of change of NOx conversion efficiency to change of reductant level in an SCR catalyst versus reductant level in an SCR catalyst.

In an aspect of the invention referred to as "perturbation control", the controller 35 can also be arranged to measure a change of NOx conversion efficiency ($d\mu_{NOx}$) across the SCR catalyst 23 and to measure a change of reductant level (dB) in the SCR catalyst. The controller 35 can be arranged to compare a measured ratio $$d\mu_{NOx}/dB \tag{2}$$

to a target ratio, usually "0" (zero) in the graph of FIG. 1B, and to control the injector 25 to adjust reductant injection to cause the measured ratio to approach the target ratio.

Figure 1C:
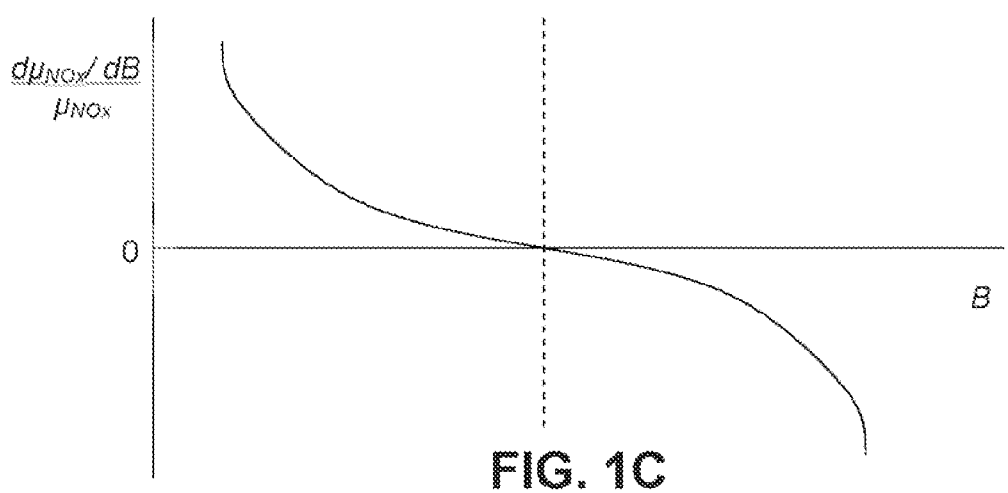
FIG. 1C is a schematic graph of a ratio of a ratio of change of NOx conversion efficiency to change of reductant level in an SCR catalyst to NOx conversion efficiency versus reductant level in an SCR catalyst.

The controller 35 can further be arranged to compare a second measured ratio of the first measured ratio to the NOx conversion efficiency $$\frac{\frac{d\mu_{NOx}}{dB}}{\mu_{NOx}} \tag{3}$$

to a second target ratio, usually "0" (zero) in the graph of FIG. 1C, and to control the injector 25 to adjust reductant injection to cause the second measured ratio to approach the second target ratio. In this way, it is possible to better ensure that feedback control will converge to a stable limit cycle.

Figure 3:
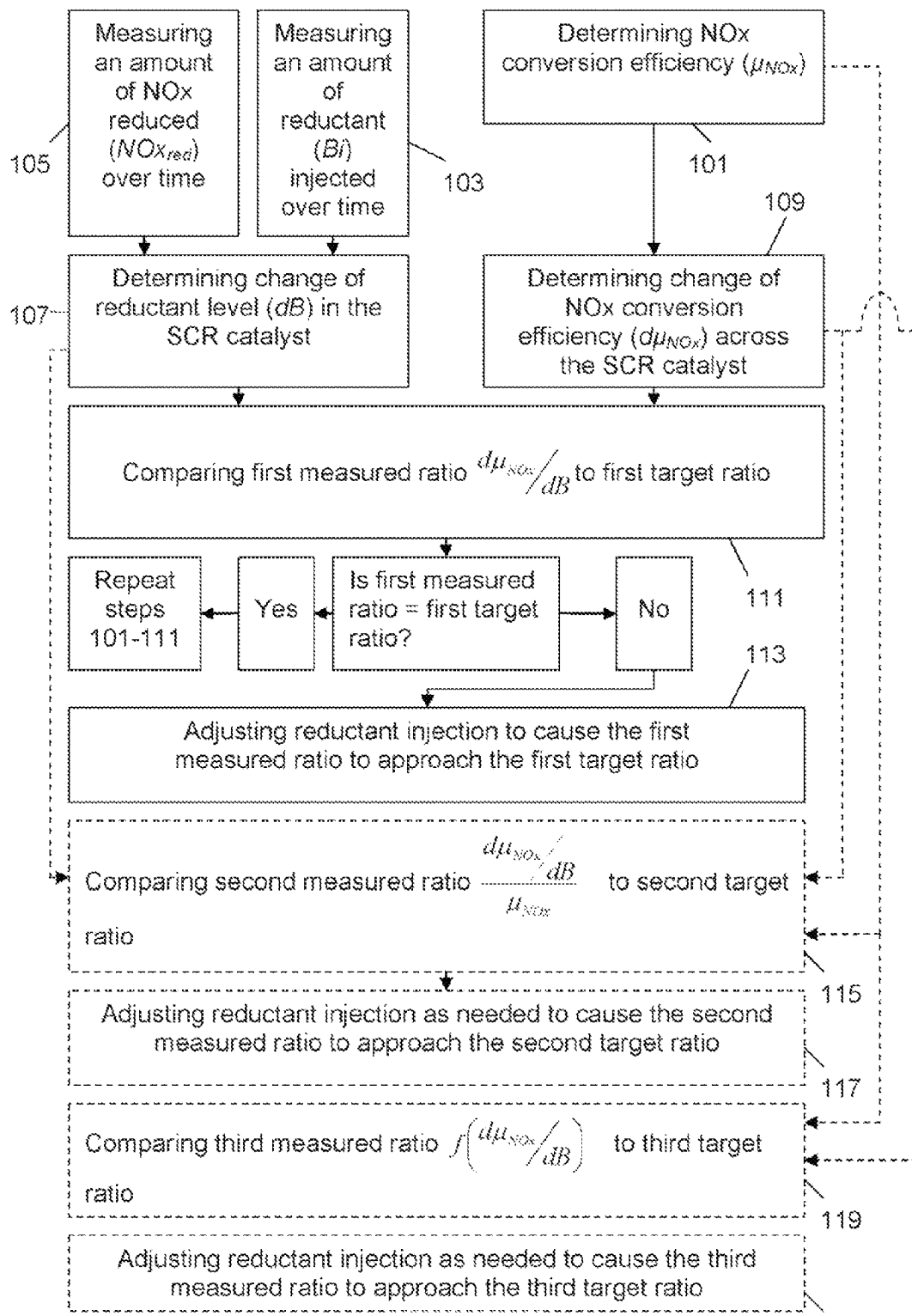
FIG. 3 is a flow chart illustrating steps in a method for controlling reductant levels in an SCR catalyst according to an aspect of the present invention.
Figure 4:
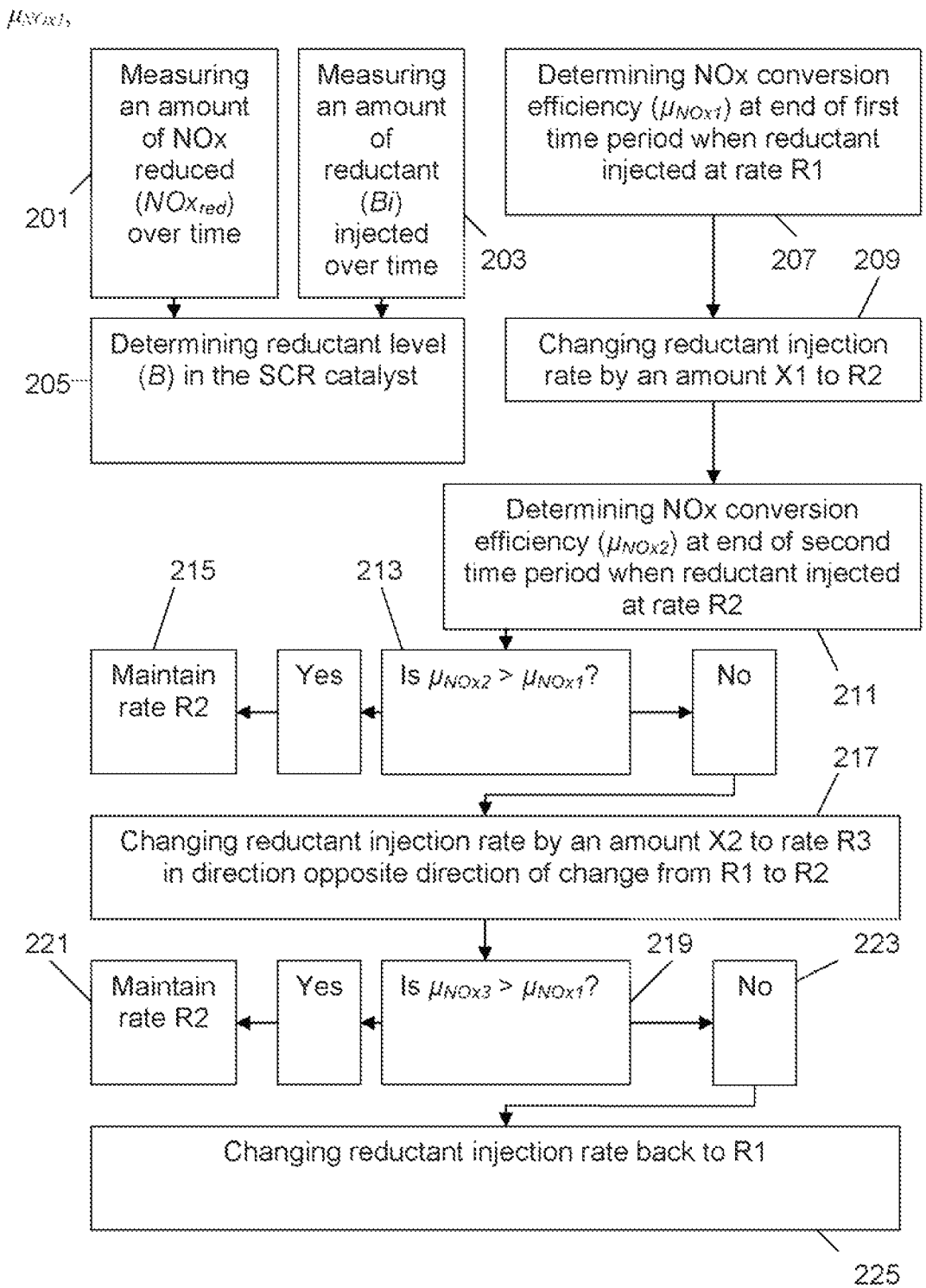
FIG. 4 is a flow chart illustrating steps in a method for controlling reductant levels in an SCR catalyst according to an aspect of the present invention. [0000]

A method of controlling reductant levels in the SCR catalyst 23 will be further described in connection with the flow chart seen in FIG. 3. In the method, step 101 includes measuring NOx levels proximate the inlet 29 (NOx(inlet)) and proximate an outlet 33 (NOx(outlet)) of the SCR catalyst 23 and determining NOx conversion efficiency by the equation (1), above.

In step 103, an amount of reductant (Bi) injected over time is measured, and in step 105, an amount of NOx reduced ($NOx_{red}$) over time is measured. In step 107, the change of reductant level (dB) in the SCR catalyst 23 is measured as a function of B and $NOx_{red}$. Technically, the change of reductant level in the SCR catalyst 23 can only be estimated or modeled with the inputs of amount of reductant (B) injected over time and the amount of NOx reduced ($NOx_{red}$) over time, however, for purposes of the present discussion, the change of reductant level (dB) in the SCR catalyst 23 shall be referred to as being measured using these inputs.

In a perturbation control aspect, in step 109, a change of NOx conversion efficiency ($d\mu_{NOx}$) across the SCR catalyst 23 is determined. In step 111, the measured ratio $$d\mu_{NOx}/dB \tag{2}$$

is compared to a target ratio. In step 113, reductant injection is adjusted, if necessary, to cause the measured ratio to approach the target ratio.

If desired (as reflected by dotted lines), in step 115, the second measured ratio $$\frac{\frac{d\mu_{NOx}}{dB}}{\mu_{NOx}} \tag{3}$$

is compared to a second target ratio and, in step 117, reductant injection is adjusted, if necessary, to cause the second measured ratio to approach the second target ratio. Also, if desired (as reflected by dotted lines), in step 119, the third measured ratio $$f(d\mu_{NOx}/dB) \tag{4}$$

is compared to a third target ratio and, in step 121, reductant injection is adjusted, if necessary, to cause the third measured ratio to approach the third target ratio. $f(d\mu_{NOx}/dB)$ is a function of $d\mu_{NOx}/dB$ that is defined such that it has a near constant negative slope across the buffer level (similar to the one shown in FIG. 1C).

A system 21 for controlling reductant levels in an SCR catalyst 23 according to another aspect of the present invention referred to as "storage correction" can be structurally similar to the system described above, but is arranged to operate differently. In the system according to this further aspect of the invention, an amount of NOx reduced over a first period of time is determined at step 201 and an amount of reductant required for the reduction is subtracted from an amount of reductant injected (Bi) over a first period of time determined at step 203, and, at step 205, the controller 35 is arranged to calculate a quantity of reductant (B) in the SCR catalyst as a function of the values determined at steps 201 and 203 according to a conventional technique for measuring (or, perhaps more accurately, estimating or modeling) reductant levels in an SCR.

The controller 35 is arranged to determine a first NOx conversion efficiency ($\mu_{NOx1}$) at an end of the first period of time at step 207 while the injector 25 injects reductant at a rate R1. At step 209, the controller 35 is arranged to control the injector 25 to change reductant injection by a change amount X1 for a second period of time to a second injection rate R2 (R2=R1−X) different from the injection rate R1 at the end of the first period of time. At step 211, the controller 35 is arranged to determine a second NOx conversion efficiency ($\mu_{NOx2}$) at the end of the second period of time.

At step 213, the controller 35 is arranged to compare $\mu_{NOx2}$ and $\mu_{NOx1}$. If $\mu_{NOx2} > \mu_{NOx1}$, at step 215, the controller 35 is arranged to control the injector 25 to maintain the second injection rate R2. If $\mu_{NOx2} \leq \mu_{NOx1}$, at step 217, the controller 35 controls the injector to change reductant injection a second amount X2 in a direction opposite a direction of the change amount (i.e., if the change amount X1 was a reduction of injection rate, then the change amount X2 will be an increase of injection rate). If, by a comparison at step 219, the NOx conversion efficiency $\mu_{NOx3}$ at this further dosing rate R3 is better than $\mu_{NOx1}$, i.e., $\mu_{NOx3} > \mu_{NOx1}$, then, at step 221, dosing remains at this changed rate and if, at step 223, $\mu_{NOx3} \leq \mu_{NOx1}$, then, at step 225, dosing will return to R1 and, ordinarily, the process will repeat to attempt to obtain increased NOx conversion efficiency. Typically, change amount X2 will be twice change amount X1. For example, if the injector 25 injects reductant at a rate of 1 unit reductant per unit time, the controller 35 might reduce the rate of reductant injection by 10%, or 0.1 units reductant per unit time, and, if NOx conversion efficiency decreases, the controller might then increase the rate of reductant injection by 0.2 units reductant per unit time.

The method for using the system 21 according to this aspect can be triggered to operate so as to change injection and, as appropriate, maintain injection at the changed level or change injection again in an opposite direction by any number of events, such as automatically after a predetermined period of operation or when NOx conversion efficiency falls below a target value. The method permits the conventional mass-based model of calculating reductant level in the SCR as shown in steps 201-205 to be substantially maintained, however, it provides for a correction that will permit the system to be operated for a substantially longer period of time than is typical in a conventional system without resetting the entire system.

It will be appreciated that perturbation control and storage control as described above are not mutually exclusive and can be run at the same time.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method of controlling reductant levels in an SCR catalyst, comprising:
   via a controller:
      determining an amount of a change of NOx conversion efficiency, expressed as $d\mu_{NOx}$, across the SCR catalyst;
      determining an amount of a change of reductant level, expressed as $dB_x$, in the SCR catalyst; and
      comparing a determined ratio of the determined change of NOx conversion efficiency to the determined change of reductant level $d\mu_{NOx}/dB$ to a target ratio; and
   injecting reductant via an injector controlled to adjust reductant injection to cause the determined ratio to approach the target ratio.

2. The method of claim 1, comprising:
   via the controller:
      determining NOx conversion efficiency, expressed as $\mu_{NOx}$, across the SCR catalyst; and
      comparing a second measured ratio $$\frac{\frac{d\mu_{NOx}}{dB}}{\mu_{NOx}}$$

to a second target ratio; and
   adjusting reductant injection to cause the second measured ratio to approach the second target ratio.

3. The method of claim 1, comprising measuring NOx levels proximate an inlet, expressed as (NOx(inlet)), and proximate an outlet, expressed as (NOxoutlet)) of the SCR catalyst and determining NOx conversion efficiency, expressed as $\mu_{NOx}$, by $$\mu_{NOx} = \frac{NOx(\text{inlet}) - NOx(\text{outlet})}{NOx(\text{inlet})}.$$

4. The method of claim 1, comprising measuring an amount of reductant (B) injected over a period of time and measuring an amount of NOx reduced, expressed as $NOx_{red}$, over the period of time and measuring dB as a function of B and $NOx_{red}$.

5. A system for controlling reductant levels in an SCR catalyst, comprising:
   an injector for injecting reductant upstream of the SCR catalyst; and
   a controller configured to
      measure an amount of a change of NOx conversion efficiency, expressed as $d\mu_{NOx}$, across the SCR catalyst,
      measure an amount of a change of reductant level, expressed as $dB_x$, in the SCR catalyst,
      compare a ratio of the measured change of NOx conversion efficiency to the measured change of reductant level $d\mu_{NOx}/dB$ to a target ratio, and
      control the injector to adjust reductant injection to cause the measured ratio to approach the target ratio.

6. The system as set forth in claim 5, comprising:
   a NOx sensor proximate an inlet of the SCR catalyst for measuring inlet NOx levels, expressed as (NOx(inlet)); and a NOx sensor proximate an outlet of the SCR catalyst for measuring outlet NOx levels, expressed as (NOx(outlet)), wherein the controller is arranged to determine NOx conversion efficiency, expressed as $\mu_{NOx}$, by $$\mu_{NOx} = \frac{NOx(\text{inlet}) - NOx(\text{outlet})}{NOx(\text{inlet})}.$$

7. The system as set forth in claim 6, wherein the controller is arranged to
compare a second measured ratio $$\frac{\frac{d\mu_{NOx}}{dB}}{\mu_{NOx}}$$

to a second target ratio, and control the injector to adjust reductant injection to cause the second measured ratio to approach the second target ratio.

8. A vehicle comprising an exhaust aftertreatment system including the system as set forth in claim 5.

9. A method of controlling reductant levels in an SCR catalyst, comprising:
a) calculating, via a controller, a quantity of reductant in the SCR catalyst as a function of an amount of reductant injected over a first period of time minus an amount of NOx reduced over the first period of time;
b) determining, via the controller, a first NOx conversion efficiency, expressed as $\mu_{NOx1}$, at an end of the first period of time;
c) injecting reductant via an injector controlled to change reductant injection by a first change amount for a second period of time to a second injection rate different from an injection rate at the end of the first period of time;
d) determining, via the controller, a second NOx conversion efficiency, expressed as $\mu_{NOx2}$, at the end of the second period of time and,
if $\mu_{NOx2} > \mu_{NOx1}$, maintaining the second injection rate, and
if $\mu_{NOx2} \leq \mu_{NOx1}$, changing reductant injection by a second change amount in a direction opposite a direction of the first change amount.

10. The method as set forth in claim 9, wherein reductant injection is changed by the first change amount by reducing reductant injection.

11. The method as set forth in claim 10, wherein the second change amount is equal to twice the first change amount.

12. The method as set forth in claim 9, comprising performing steps c) and d) when NOx conversion efficiency falls below a target value.

13. A system for controlling reductant levels in an SCR catalyst, comprising:
an injector for injecting reductant upstream of the SCR catalyst; and
a controller configured to
calculate a quantity of reductant in the SCR catalyst as a function of an amount of reductant injected over a first period of time minus an amount of NOx reduced over the first period of time,
determine a first NOx conversion efficiency, expressed as $\mu_{NOx1}$, at an end of the first period of time;
control the injector to change reductant injection by a first change amount for a second period of time to a second injection rate different from an injection rate at the end of the first period of time;
determine a second NOx conversion efficiency, expressed as $\mu_{NOx2}$, at the end of the second period of time and,
if $\mu_{NOx2} \geq \mu_{NOx1}$, control the injector to maintain the second injection rate, and
if $\mu_{NOx2} < \mu_{NOx1}$, control the injector to change reductant injection by a second change amount in a direction opposite a direction of the change amount.

14. The system as set forth in claim 13, comprising:
a NOx sensor proximate an inlet of the SCR catalyst for measuring inlet NOx levels, expressed as (NOx(inlet); and
a NOx sensor proximate an outlet of the SCR catalyst for measuring outlet NOx levels, expressed as (NOx(outlet)),
wherein the controller is arranged to determine NOx conversion efficiency, expressed as $\mu_{NOx}$, by $$\mu_{NOx} = \frac{NOx(\text{inlet}) - NOx(\text{outlet})}{NOx(\text{inlet})}.$$

15. An apparatus, comprising:
a vehicle;
an exhaust aftertreatment system; and
the system as set forth in claim 13.

* * * * *